(12) United States Patent
Okemoto et al.

(10) Patent No.: US 10,490,870 B2
(45) Date of Patent: Nov. 26, 2019

(54) MAGNESIUM-AIR BATTERY

(71) Applicants: YTS SCIENCE PROPERTIES PTE. LTD., Singapore (SG); Kyoko Okemoto, Kita-ku Tokyo (JP); Takashi Yabe, Kita-ku Tokyo (JP)

(72) Inventors: Kyoko Okemoto, Kita-ku Tokyo (JP); Takashi Yabe, Kita-ku Tokyo (JP)

(73) Assignee: YTS SCIENCE PROPERTIES PTE. LTD., International Plaza (SG)

( * ) Notice: Subject to any disclaimer, the term of this patent is extended or adjusted under 35 U.S.C. 154(b) by 232 days.

(21) Appl. No.: 15/565,856

(22) PCT Filed: Apr. 6, 2016

(86) PCT No.: PCT/JP2016/061215
§ 371 (c)(1),
(2) Date: Jan. 24, 2018

(87) PCT Pub. No.: WO2016/167164
PCT Pub. Date: Oct. 20, 2016

(65) Prior Publication Data
US 2018/0138566 A1    May 17, 2018

(30) Foreign Application Priority Data

Apr. 15, 2015   (JP) ................. 2015-083695

(51) Int. Cl.
*H01M 12/06*   (2006.01)
*H01M 4/38*    (2006.01)

(52) U.S. Cl.
CPC ......... *H01M 12/065* (2013.01); *H01M 4/381* (2013.01)

(58) Field of Classification Search
CPC ..... H01M 12/00; H01M 12/065; H01M 4/381
See application file for complete search history.

(56) References Cited

U.S. PATENT DOCUMENTS

| 5,228,529 A * | 7/1993 | Rosner | B60L 8/003 180/65.225 |
| 7,001,497 B2 * | 2/2006 | Gagne | C25C 3/06 205/81 |
| 2003/0003338 A1 * | 1/2003 | Yang | H01M 2/1653 429/406 |
| 2017/0309981 A1 * | 10/2017 | Miller | H01M 4/38 |

* cited by examiner

*Primary Examiner* — Matthew J Merkling
(74) *Attorney, Agent, or Firm* — Perkins Coie LLP

(57) ABSTRACT

The present invention is designable on any thickness of magnesium thin plate, providing collectable power supply to the battery part of fuel body.
The magnesium air battery 100 provides:
the fuel body supply 200 including multiples of magnesium fuel bodies 101 that include magnesium; battery part 300 formed of conductive materials and an electrode that supplies electrons to oxygen; the disposal outlet 400, containing the fuel body integration part 401 that collects the exhausted magnesium fuel body 101; the fuel body holding frame 303, where the magnesium fuel body 101 is in a detachable hold, which moves through the fuel body supply 200, the battery part 300 and the disposal outlet 400.

9 Claims, 4 Drawing Sheets

[FIG. 1]
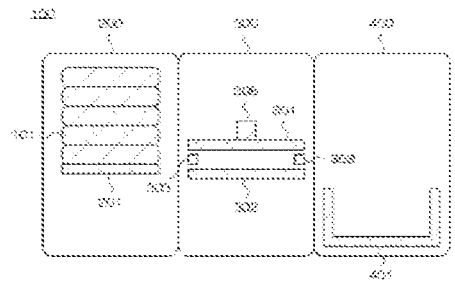
[FIG. 2]
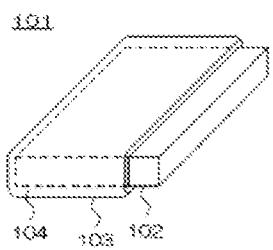
[FIG. 3]
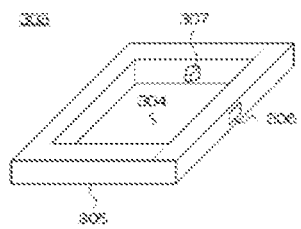
[FIG. 4]
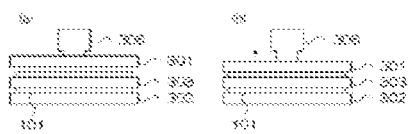
[FIG. 5]
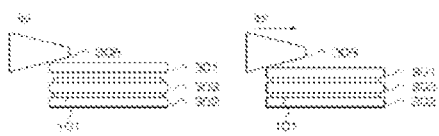
[FIG. 6]
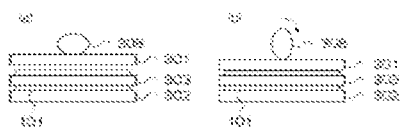

[FIG. 7]
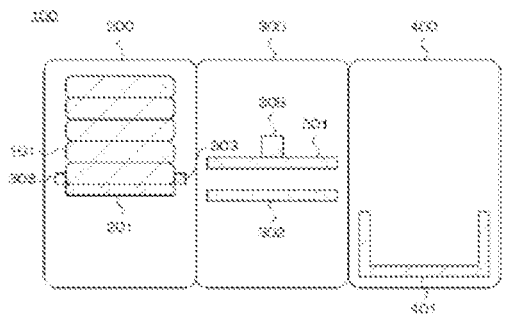
[FIG. 8]
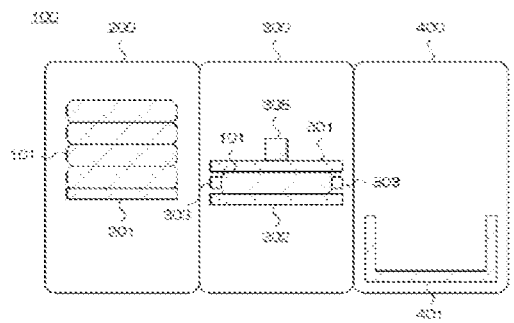
[FIG. 9]
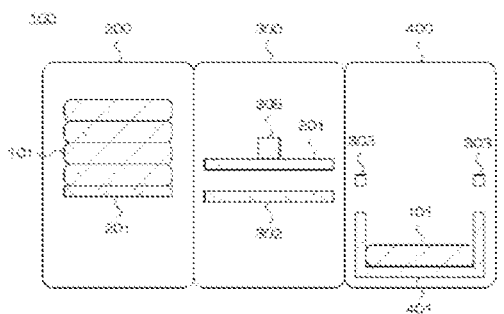
[FIG. 10]
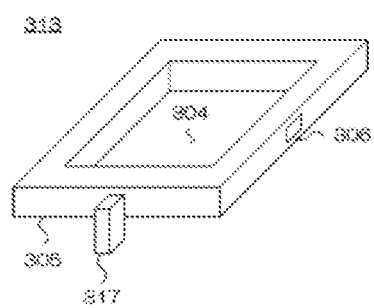

[FIG. 11]
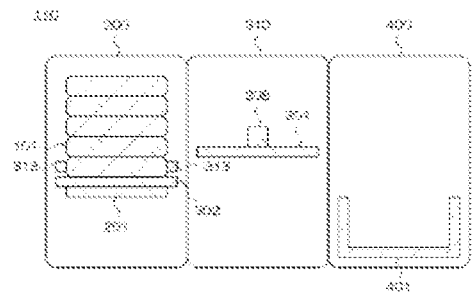
[FIG. 12]
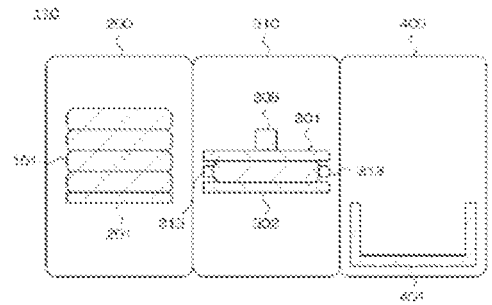
[FIG. 13]
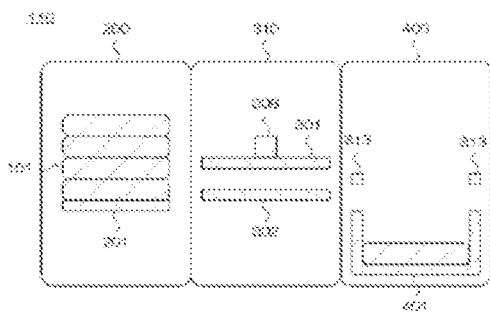

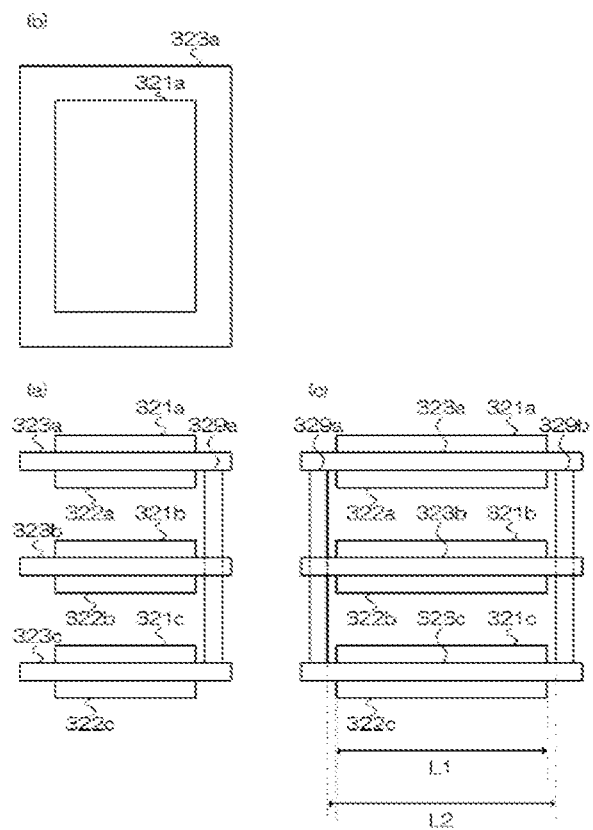
[FIGS. 14]

MAGNESIUM-AIR BATTERY

TECHNICAL FIELD

The present invention relates to a magnesium air battery.

BACKGROUND ART

Patent Document 1 discloses a cartridge type of a magnesium air battery, as an example of a magnesium air battery, which active material is oxygen in the air as a cathode, and magnesium as an anode. Specifically, in the magnesium air battery described in Patent Document 1, each end of the magnesium film is connected to the pair of reels, and along with the magnesium film being wound by rotating the reels, magnesium films between the reels will generate power in cooperation with the cathode, which is located in the vicinity thereof.

PRIOR ART DOCUMENTS

Patent Literature

Patent Literature 1: Patent Publication No. 2012-15013

SUMMARY OF INVENTION

Problems to be Solved by the Invention

The thickness of the magnesium effects the response speed and duration in the magnesium air battery, which is one of the important factors that determine the characteristics of the battery. It is necessary to use magnesium in various thicknesses, in order to develop a battery with a variety of characteristics. However, it will be difficult to wind magnesium in a cylindrical form, if the thickness of magnesium exceeds 100 μm. Therefore, in the structure of magnesium air battery stated in Patent Document 1, where magnesium film is wound on reels, there is a problem that the thickness of magnesium possible to be used will be limited to about 100 μm.

A new structure other than the magnesium film being wound on reels is necessary, in order to construct a magnesium battery that enables power supply to the battery part of any magnesium thickness, including those in excess of 100 μm, and to collect the exhausted magnesium.

The present invention has been made in a view of the related challenge, and seeks to enable power supply to the battery part of fuel body and to collect such on any designable thickness of magnesium thin plate.

Means to Solve the Problems

In order to meet the above mentioned object, according to a first aspect of the present invention, said magnesium air battery will provide:

a fuel body supply including multiple magnesium fuel bodies containing magnesium, a battery part containing an electrode, which is formed from conductive materials and supplies electrons to oxygen, a disposal outlet containing a fuel body integration part that collects said exhausted magnesium fuel body, a fuel body holding frame, wherein said magnesium fuel body is held removable, which moves through said fuel body supply, said battery part and said disposal outlet.

Said fuel body holding frame, may move to said fuel body supply, receive and hold said magnesium fuel body, may move to said battery part, said magnesium fuel body may come into contact with said electrode and generate reaction, may move to said disposal outlet, release said magnesium fuel body and collect in said fuel body integration part.

Said electrode may provide an upper cathode electrode in contact with the surface of the magnesium fuel body and a lower cathode electrode in contact with the back surface of lower cathode electrode.

Said fuel body frame may provide a pawl to support the magnesium fuel body.

Said fuel body holding frame may comprise a pawl, holding said lower cathode electrode in a removable manner, said fuel body holding frame and said lower cathode electrode may move through said fuel body supply and said battery part, holding said magnesium fuel body in a removable manner.

Said fuel body holding frame may provide a frame, wherein magnesium fuel body is held, and an electrode part which is electrically connected to magnesium fuel body.

Said magnesium fuel body may be installed on said fuel body supply in a stack.

Said magnesium fuel body may provide:

a magnesium thin plate containing magnesium, an electrolyte holding part, which exposes part of magnesium thin plate and covers other part except for the exposed part, an electrolyte contained in holding part.

Said magnesium fuel body may provide multiples of fuel body holding frames, battery part may contain number of electrode corresponding to that of said fuel body holding frame.

Advantageous Effects of Invention

According to the present invention, magnesium fuel of any thickness can be provided continuously from a fuel supply location common to each battery, which can be provided to battery part of fuel body, and can provide collectable magnesium air battery.

BRIEF DESCRIPTION OF DRAWINGS

FIG. 1 is a section view showing a construction of a magnesium air battery, according to the first embodiment.

FIG. 2 is a perspective view showing a construction of a magnesium fuel body.

FIG. 3 is a perspective view showing a construction of a fuel body holding frame.

FIG. 4 is a side view showing an example of a pressurizing part.

FIG. 5 is a side view showing an example of a pressurizing part.

FIG. 6 is a side view showing an example of a pressurizing part.

FIG. 7 is a section view showing a construction of a magnesium air battery, according to the first embodiment.

FIG. 8 is a section view showing a construction of a magnesium air battery, according to the first embodiment.

FIG. 9 is a section view showing a construction of a magnesium air battery, according to the first embodiment.

FIG. 10 is a perspective view showing a construction of a fuel body holding frame.

FIG. 11 is a section view showing a construction of a magnesium air battery, according to the second embodiment.

FIG. 12 is a section view showing a construction of a magnesium air battery, according to the second embodiment.

FIG. 13 is a section view showing a construction of a magnesium air battery, according to the second embodiment.

FIG. 14 are (a) a front view, (b) a plan view, and (c) a side view showing constructions of a fuel body holding frame and a cathode electrode.

DESCRIPTION OF EMBODIMENTS

Hereinafter, magnesium air battery, according to embodiments of the present invention, will be described with reference to the drawings.

First Embodiment

First, an example of the magnesium air battery that generates electromotive force using magnesium as a fuel will be explained. FIG. 1 is a section view showing a construction of the magnesium air battery 100. The magnesium air battery 100 comprises the fuel body supply 200, the battery part 300 and the disposal outlet 400 as shown in FIG. 1. The fuel body supply 200, the battery part 300 and the disposal outlet 400 are installed contiguous to each other.

The fuel body supply 200 is a portion where the magnesium fuel body 101 is installed and supplies the magnesium fuel body 101 with the battery part 300. The fuel body supply 200 contains the magnesium fuel body 101 and the stand 201.

FIG. 2 is a perspective view showing a configuration of the magnesium fuel body 101. As shown in FIG. 2, the magnesium fuel body 101 is formed by enclosing the magnesium thin plate 102 with an electrolyte holding part 103 that holds the electrolyte 104. As shown in FIG. 1, the magnesium fuel bodies 101 are installed in the fuel body supply part 200 by stacking multiple of stacked products. The magnesium fuel body 101 functions as a fuel of the magnesium air battery 100.

The magnesium thin plate 102 is a thin metal magnesium plate, formed in strip formed thickness T. An edge of the magnesium thin plate 102 is exposed from the electrolyte holding part 103, and this exposed portion functions as an anode electrode, as shown in FIG. 2.

The electrolyte holding part 103 impregnates and holds the electrolyte 104. Examples of the material forming the electrolyte holding part 103 include but not limited to, filter paper, nonwoven fabric, felt, carbon felt. Water is supplied from the outside (not shown) to the electrolyte holding part 103. The electrolyte holding port 103 functions as a separator of the magnesium air battery 100.

The electrolyte holding part 103 is formed from materials with flexibility, configured to make the bent portion with rounded sides. Therefore, the fuel body holding frame 303 can be inserted between the magnesium fuel body 101, in a condition where the magnesium fuel body 101 is stacked.

The electrolyte 104 is an electrolyte, which enables ion exchanges between the magnesium fuel body 101, the upper cathode electrode 301 and the lower cathode electrode 302, which will be described afterward. In addition, water contained in the electrolyte 104 is used as a reaction in which oxygen is reduced at the upper cathode electrode 301 and the lower cathode electrode 302. For example, the electrolyte 104 is an aqueous sodium chloride solution, but not limited thereto.

With reference back to FIG. 1, the stand 201 is a stand for installing the magnesium fuel body 101. The fuel body supply 200 stores the magnesium fuel body 101 by stacking the magnesium fuel body 101 on the stand 201.

The battery part 300 is a portion where electromotive force is generated with oxidation-reduction. The battery part 300 is installed between the fuel body supply 200 and the disposal outlet 400, containing the upper cathode electrode 301, the lower cathode electrode 302, the fuel body holding frame 303 and the pressurizing part 308, as shown in FIG. 1.

Both the upper cathode electrode 301 and the lower cathode electrode 302 are formed from materials with conductivity, and supplies electrons to the oxygen in the air, which is a cathode active material of the magnesium air battery 100. In addition, it is desirable that the upper cathode electrode 301 and the lower cathode electrode 302 have a large surface area and can adsorb oxygen easily, in order to promote the reaction for reducing oxygen.

Materials for forming the upper cathode electrode 301 and the lower cathode electrode 302 for example, not limited to but include and are a combination of; carbon, metals, manganese compounds. Regarding carbon, these forms may include activated carbon, carbon powder, carbon fibers, carbon nanotubes, and carbon felt.

The fuel body holding frame 303 functions as a frame holding the magnesium fuel body 101 in a detachable hold. FIG. 3 is a perspective view showing a construction of the fuel body holding frame 303. The fuel body holding frame 303 comprises the hole 304, which size is acceptable to store the magnesium fuel body 101, the frame 305 surrounding the hole 304, the electrode 306 passing through the frame 305, and the pawl 307, as shown in FIG. 3. The fuel body holding frame 303 is arranged between the upper cathode electrode 301 and the lower cathode electrode 302 being installed facing parallel to each other, comprising a mechanism that moves between the fuel body supply 200, the battery part 300 and the disposal outlet 400 in parallel to the surface of the upper cathode electrode 301 and the lower cathode electrode 302. Mechanisms on which the fuel body holding frame 303 moves includes for example, but not limited to: rails, belts, and mechanisms using wheels.

The fuel body holding frame 303 is provided inside the frame 305 with a pawl 307 that detachably supports the magnesium fuel body 101. The fuel body holding frame 303 holds the magnesium fuel body 101 by accommodating the magnesium fuel body 101 in the hole 304 and the pawl 307 supporting the side of the magnesium fuel body 101. At this time, a portion exposed inside the frame 305 of the electrode 306 passing through the frame 305 and the portion exposed of the magnesium thin plate 102 are electrically connected. Then, the portion exposed outside the frame 305 of the electrode 306 functions as an electrode for the outside.

The pressurizing part 308 is arranged, contacting the surface of the upper cathode electrode 301 on the upper part of the upper cathode electrode 301, and is configured to press the upper cathode electrode 301 against the magnesium fuel body 101.

An arbitrary mechanism can be adopted by which the pressurizing unit 308 presses the upper cathode electrode 301 against the magnesium fuel body 101. For example, a force or a force may be applied in the direction of the arrow so that the state shown in FIG. 4 (a) is changed to the state show in FIG. 4 (b) by using a spring or a motor. Also, using a wedge-shaped cam in a cross section, so that the state of FIG. 5 (a) can reach the state of FIG. 5 (b), the pressurizing part 308 may be moved parallel in the direction of the arrow to the surface of upper cathode electrode 301. Furthermore, the pressurizing part 308 may be rotated so that the state of FIG. 6 (a) is changed to the state of FIG. 6 (b) by using a cam with an elliptical cross section.

The disposal outlet 400 is a portion where the exhausted magnesium fuel body 101 is disposed. The fuel body integration part 401 installed contiguous to the battery part 300 is contained, as shown in FIG. 1.

The fuel body integration part 401 is configured to a box shape in order to store the exhausted magnesium fuel body 101. The fuel body integration part 401 separates from the upper cathode electrode 301 and the lower cathode electrode 302 to an extent that they do not overlap with each other in the vertical direction and is disposed below the upper cathode electrode 301 and the lower cathode electrode 302.

The fuel body supply 200, the battery part 300 and the disposal outlet 400 are arranged into a line so that the fuel body holding frame 303 can go back and forth by parallel movement. Moreover, the magnesium fuel body 101 placed at the bottom most of the fuel body supply 200 is arranged at a height to be held within the frame, when the fuel body holding frame 303 moves to the fuel body supply 200.

Next, with reference to FIGS. 7-9, how the magnesium air battery 100 will generate the electromotive force by using the magnesium fuel body 101 as a fuel for the magnesium air battery 100 will be described. FIGS. 7-9 are section views showing constructions of the magnesium air battery 100.

First, the fuel body holding frame 303 moves from the battery part 300 to the fuel body supply 200 in parallel, being inserted between the bottom portion of the fuel body supply 200 and the bottom most of the magnesium fuel body 101, receives and holds one of the magnesium fuel body 101, as shown in FIG. 7.

Next, the fuel body holding frame 303 moves to the battery part 300, holding the magnesium fuel body 101, being inserted between the upper cathode electrode 301 and the lower cathode electrode 302, as shown in FIG. 8. From this condition, the reaction initiates from the upper cathode electrode 301 and the lower cathode electrode 302 being strongly pressed against the magnesium fuel body 101 with the pressurizing part 308 pressing down the upper cathode electrode 301 from the top.

The magnesium fuel body 101 contacts each with the upper cathode electrode 301 and the lower cathode electrode 302, the electrolyte holding part 103 of the magnesium fuel body 101 functions as a separator, and the electrolyte 104 impregnated in the electrolyte holding part exchanges ions in the condition of FIG. 8. Thus, the magnesium air battery 100, with oxygen in the air as a cathode active material, generates electromotive force with oxidation-reduction reaction that shifts magnesium contained in the magnesium thin plate 102 to an anode active material.

The reaction time of the magnesium air battery 100, depending on the thickness of the magnesium thin plate 102, lasts for about several ten minutes to an hour, if the thickness of the magnesium thin plate 102 is about 1 mm. The magnesium fuel body 101 being inserted in the battery part 300 will exhaust along with the progress of the reaction.

On the other hand, after the magnesium fuel body 101 placed at the bottommost of the fuel body supply 200 is withdrawn, the magnesium fuel bodies stacked upon it move in a downward direction consecutively, so as to fill the gaps with the power pushing down the entire magnesium fuel body, such as gravity or mechanical power including springs, being stacked in the same way as before being used.

The fuel body holding frame 303 moves from the battery part 300 to the disposal outlet 400, holding the magnesium fuel body 101, if the magnesium fuel body 101 is exhausted along with the progress of the reaction, as shown in FIG. 9. The fuel body holding frame 303 releases the magnesium fuel body 101 and the magnesium fuel body 101 will be collected at the fuel body integration part 401 placed beneath the disposal outlet 400, where the pawl of the fuel body holding frame 303 releases the magnesium fuel body 101.

Then, the fuel body holding frame 303 moves to the battery part 300, repeating the processes of FIGS. 7-9.

As described above, the magnesium air battery 100 can generate an electromotive force with the magnesium fuel body 101 as a fuel.

Since the magnesium air battery 100 stores the magnesium fuel body 101 prior to the reaction in a stack, even the magnesium thin plates not capable to be wound on a reel can be used as a fuel.

Since the magnesium fuel body 101 to be used features bulk fuel supply to the fuel body supply 200, replenishment of the fuel is easy. In addition, bulk collection of the exhausted magnesium fuel body 101 integrated in the disposal outlet 400 is featured, so collection of the exhausted fuel is also easy.

Second Embodiment

Next, another example of the magnesium air battery which electromotive force is generated with magnesium as a fuel will be described. The same reference numerals are used for the same or similar elements in the first embodiment.

The magnesium air battery 110, according to the second embodiment, includes the battery part 310, where the fuel body holding frame 313 is also included.

FIG. 10 is a perspective view showing a construction of the fuel body holding frame 313. The fuel body holding frame 313 provides the pawl 317 on the outside portion of the frame 305, as shown in FIG. 10. The pawl 317 is a pawl holding the lower cathode electrode 302 in a detachable hold. The lower cathode electrode 302 will be able to move from the battery part 310, following the fuel body holding frame 313, if the pawl 317 holds the lower cathode electrode 302.

The fuel body holding frame 313 cooperates with the lower cathode electrode 302, held in the pawl 317, that accommodates the magnesium fuel body 101 in the hole 304, supporting the magnesium fuel body 101 with the lower cathode electrode 302 holding the bottom of the magnesium fuel body 101.

Next, with reference to FIGS. 11-13, how the magnesium air battery 110 will generate the electromotive force by using the magnesium fuel body 101 as a fuel for the magnesium air battery 110 will be described. FIGS. 11-13 are section views showing constructions of the magnesium air battery 100.

First, the fuel body holding frame 313 and the lower cathode electrode 302 move from the battery part 310 to the fuel body supply 200 in parallel, in a condition where the pawl 317 of the fuel body holding frame 313 is holding the lower cathode electrode 302, being inserted between the bottom portion of the fuel body supply 200 and the bottom of the magnesium fuel body 101, holding one of the magnesium fuel body 101, as shown in FIG. 11.

Next, the fuel body holding frame 313 and the lower cathode electrode 302 move to the battery part 310, holding the magnesium fuel body 101, being arranged beneath the upper cathode electrode 301, as shown in FIG. 12. From this condition, the reaction initiates with the upper cathode electrode 301 and the lower cathode electrode 302 being strongly pressed against the magnesium fuel body 101 with the pressurizing part 308 pressing down the upper cathode electrode 301 from above.

An electromotive force is generated with oxidation-reduction reaction in the condition of FIG. 12.

The pawl 317 of the fuel body holding frame 313 releases the lower cathode electrode 302, if the magnesium fuel body 101 is exhausted along with the progress of the reaction. Then, the fuel body holding frame 313 moves from the battery part 310 to the disposal outlet 400, without following the lower cathode electrode 302, as shown in FIG. 13. The magnesium fuel body 101 falls from the hole 304 of the fuel body holding frame 313, and the magnesium fuel body 101 will be collected at the fuel body integration part 401 of the disposal outlet 400 at this point.

Then, the fuel body holding frame 313 moves to the battery part 310, repeating the processes of FIGS. 11-13.

As described above, the magnesium air battery 110 can generate an electromotive force with the magnesium fuel body 101 as a fuel.

Third Embodiment

Next, an example of the magnesium air battery comprising plurality of cathode electrode sets will be described, using FIG. 14. FIG. 14 are (a) a front view, (b) a plane view, and (c) a side view showing constructions of the magnesium air battery 120 providing the battery part 320. The battery part 320 comprises three sets of combinations of the upper cathode electrode 301 and the lower cathode electrode 302, as shown in FIG. 14. Each of the three cathode electrode sets provides the upper cathode electrode 321a, 321b and 321c with the lower cathode electrode 322a, 322b and 322c respectively, in order of top, middle and bottom, each being inserted with the fuel body holding frame 323a, 323b and 323c between the upper cathode electrode and the lower cathode electrode, respectively.

At this time, each of the three fuel body holding frame is connected vertically at both edges of a side by the connecting post 329a and 329b (collectively referred to as the connecting post 329), where three fuel body holding frames move together.

These three components, as represented by the fuel body holding frame 323a, 323b and 323c, all similar structures, functions and operations. Therefore, they may be representatively excluded to be abbreviated as fuel body holding frame 323.

The interval L2 between the connecting post 329a and the connecting post 329b is longer than the long side of the upper cathode electrode 321 and the lower cathode electrode 322 L1, as shown in FIG. 14 (c). Consequently, the fuel body holding frame 323 can move to the fuel body supply 200 or to the disposal outlet 400 without the connecting post 329 interfering with the upper cathode electrode 321 or the lower cathode electrode 322.

The connected fuel body holding frame 323a, 323b and 323c are all inserted in the stacked magnesium fuel body 101 in the fuel body supply 200, each holding the magnesium fuel body 101a, 101b and 101c, respectively.

In addition, the connected fuel body holding frame 323a, 323b and 323c in the disposal outlet 400 respectively releases the exhausted magnesium fuel body 101, and the magnesium fuel body 101 is collected at the fuel body integration part 401 beneath the disposal outlet 400.

Since the magnesium fuel body 101 to be used is only supplied from the fuel body supply 200, featuring bulk fuel supply to the fuel body supply 200, even if the number of electrodes increases, replenishment of the fuel is easy. Similarly, the exhausted magnesium fuel body 101 is also integrated in the disposal outlet 400, featuring bulk collection of those integrated in the disposal outlet 400, which enables the collection of the exhausted fuel to be easy as well.

Having thus described on embodiments of the present invention, the present invention is not limited to the above embodiments.

The magnesium thin plate 102 was described to be formed from a metallic magnesium thin plate, as an example, but not limited thereto. For example, any magnesium fuel thin plate 102 intended to elute magnesium ions are accepted, and may be formed from an alloy containing magnesium, magnesium compound or a metallic magnesium and such forming zinc film on the surface.

In addition, the magnesium air battery 120 was described to provide but not limited to; three sets of electrodes in the third embodiment. For example, it may be constructed to include any sets of electrodes, such as two sets or four sets, in accordance with the required current and voltage.

EXPLANATION OF REFERENCES 100, 110, 120 Magnesium Air Battery
101 Magnesium Fuel Body
102 Magnesium Thin Plate
103 Electrolyte Holding Part
104 Electrolyte
200 Fuel Body Supply
201 Stand
300 Battery Part
301, 321, 321a-321c Upper Cathode Electrode
302, 322, 322a-322c Lower cathode electrode
303, 313, 323, 323a-323c Fuel Body Holding Frame
304 Hole
305 Frame
306 Electrode
307, 317 Pawl
308 Pressurizing Part
400 Disposal Outlet
401 Fuel Body Integration Part

The invention claimed is:

1. A magnesium air battery comprising:
   a fuel body supply including multiple magnesium fuel bodies containing magnesium;
   a battery part containing an electrode, which is formed from conductive materials and supplies electrons to oxygen;
   a disposal outlet containing a fuel body integration part that collects the exhausted magnesium fuel body; and
   a fuel body holding frame, wherein the magnesium fuel body is held removable, which moves through the fuel body supply, the battery part and the disposal outlet.

2. The magnesium air battery according to claim 1,
   wherein the fuel body holding frame moves to the fuel body supply, receiving and holding the magnesium fuel body,
   the fuel body holding frame moves to the battery part, generating reaction by contacting the magnesium fuel body with the electrode, and
   the fuel body holding frame moves to the disposal outlet, releases the magnesium fuel body, and collects the magnesium fuel body in the fuel body integration part.

3. The magnesium air battery according to claim 1,
the electrode containing:
an upper cathode electrode, contacting surface of the magnesium fuel body; and
a lower cathode electrode, contacting back of the magnesium fuel body.

4. The magnesium air battery according to claim 1,
the fuel body holding frame containing a pawl which supports the magnesium fuel body.

5. The magnesium air battery according to claim 3,
the fuel body holding frame containing a pawl, holding the lower cathode electrode in a removable manner,
the fuel body holding frame and the lower cathode electrode moving through the fuel body supply and the battery part, holding the magnesium fuel body in a detachable hold.

6. A The magnesium air battery according to claim 1,
the fuel body holding frame containing:
a frame, wherein the magnesium fuel body is held; and
an electrode part which is electrically connected to the magnesium fuel body.

7. The magnesium air battery according to claim 1,
the magnesium fuel body installed on the fuel body supply in a stack.

8. The magnesium air battery according to claim 1,
the magnesium fuel body containing:
a magnesium thin plate containing magnesium;
an electrolyte holding part, which exposes part of the magnesium thin plate and covers other part except for the exposed part; and
an electrolyte contained in the holding part.

9. The magnesium air battery according to claim 1,
the magnesium fuel body containing multiples of the fuel body holding frames,
the battery part containing the number of the electrodes corresponding to the number of the fuel body holding frames.

* * * * *